June 14, 1960     R. A. SANDBERG     2,940,162
HEAT EXCHANGER AND METHOD OF MAKING SAME
Original Filed April 8, 1955
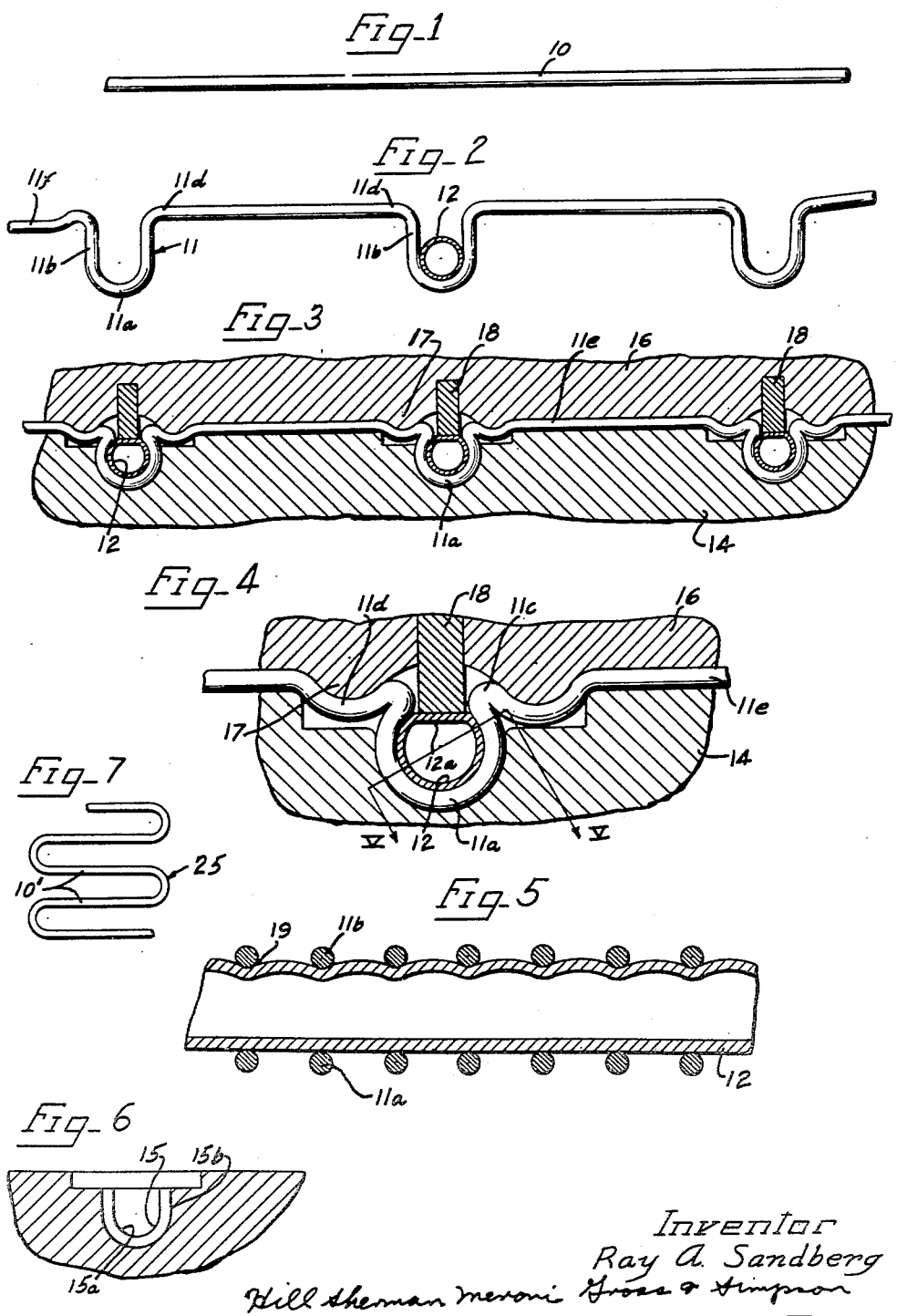
Inventor
Ray A. Sandberg
by Hill Sherman Meroni Gross & Simpson
Attys.

United States Patent Office 2,940,162
Patented June 14, 1960

2,940,162

HEAT EXCHANGER AND METHOD OF MAKING SAME

Ray A. Sandberg, Waukegan, Ill., assignor to Houdaille Industries, Inc., Buffalo, N.Y., a corporation of Michigan Original application Apr. 8, 1955, Ser. No. 500,152. Divided and this application Mar. 15, 1956, Ser. No. 571,716

3 Claims. (Cl. 29—157.3)

The present invention relates to a heat exchanger and method of making the same, and more particularly to a heat exchanger of the type having a tube secured to an elongated heat conductive member by deformation of the member and to an improved method of making such a heat exchanger.

In accordance with an embodiment of the present invention, a tube and wire heat exchanger is manufactured by forming wires about more than a semi-periphery of each of a series of tubes. Tube and wire heat exchangers at the present time involve a large number of welds per assembly, for example as many as 2600, and fabrication of such assemblies involves extremely expensive and complicated machinery. Further, if the tube is burnt through in the welding operation at even a single one of the 2600 welds, the entire assembly must be discarded. By eliminating the welding as a fastening means, the costly equipment and danger of weld failure is avoided and important savings are effected.

It is therefore an important object of the present invention to provide an improved type heat exchanger in which a tube is secured to a heat conductive member without the employment of external fastening means.

Another object of the present invention is to provide an improved method of making a heat exchanger by deforming a heat conductive member into greater than semi-peripheral surface contact with the heat exchange tubing to maintain the components in assembled efficient heat transfer relation.

It is a further important object of the present invention to provide a heat exchanger in which heat exchange tubing is secured within a groove or bend formed in a heat conductive member, with portions of the member extending into conforming contact with the tube above a median diameter thereof to securely lock the tube to the member.

A still further important object of this invention is to provide an improved method of forming a heat exchanger having a heat conductive member and heat exchange tubing.

Still another object of the present invention is to provide a method of making a heat exchanger by disposing a tube in a groove or bend formed in a heat conductive member and depressing immediately contiguous portions of the member to force the member into greater than semi-peripheral contact with the tube.

A more specific object of the present invention is to provide an improved tube and wire type heat exchanger and method of making the same.

Other and further important objects of the present invention will be apparent from the disclosure in the specification and in the accompanying drawings.

On the drawings:

Figure 1 illustrates the initial condition of a wire which is to be assembled into a tube and wire heat exchanger according to the present invention;

Figure 2 illustrates the condition of the wire after the grooves or bends have been formed therein in preparation for receiving the heat exchanger tubing;

Figure 3 illustrates the formation of the wire into conforming contact with more than a semi-periphery of the tubing;

Figure 4 is an enlarged cross-sectional view similar to Fig. 3;

Figure 5 is a longitudinal sectional view taken generally along the line V—V of Fig. 4;

Figure 6 is a sectional view of the lower die used in performing the method of Figs. 1–5; and Figure 7 illustrates a sinuous wire configuration for providing a plurality of parallel lengths on which the method of Figs. 2 to 6 may be practiced.

As shown on the drawings:

Referring to Figs. 1 to 6 of the drawings, a method of forming a tube and wire heat exchanger is illustrated. In this method, a straight length of wire such as indicated at 10 is first provided with a plurality of grooves or bends 11, which grooves extend transversely to the length of the wire and have semi-circular portions 11a defining the bottoms of the grooves of substantially the same inside diameter as the outside diameter of the tubing 12 to be inserted therein. The grooves also include generally straight upstanding parallel portions of the wire 11b defining the sides of the groove and rising above the tubing when the tubing is bottomed in the grooves. The ends of the wire may be offset as indicated at 11f for stabilizing the ends during the forming operation of Figs. 3 and 4.

During the forming operation as illustrated in Fig. 3, the semi-circular portions 11a of the wire are rigidly and conformingly backed by means of a lower die 14. The lower die 14 as indicated in Fig. 6 is provided with a transverse groove 15 having a semi-cylindrical bottom portion 15a of diameter to exactly receive the external diameter of the tubing. The die further has recessed portions spaced therealong as indicated at 15b for receiving the groove portions of successive wires, the spacing of the wires along each tube being indicated in Fig. 5. The upper die 16 is provided with protuberances such as 17 for exerting a reshaping pressure against unbacked upstanding portions 11b of each groove and contiguous portions 11d of the wire on each side of the groove to form a fold. The folds on each side of the groove are moved toward each other and reshaped into conforming contact with the tubing.

A punch bar 18 carried with the upper die 16 deforms the tubing 12 into a non-circular cross section including a flat portion 12a. This flattening operation also drives portions of the tube 12 against the adjacent portions of the wires to wrap the tube partially about the wires as indicated at 19 in Fig. 5. The protuberances 17 simultaneously drive the portions 11c of the wires against the portion 19 of the tubing. Thus the wire is actually indented into the tube to form a series of transverse ridges such as 20 in Fig. 5 which will cause turbulence in the flow of heat exchange fluid through the tubing.

The dies may also be so proportioned as to flatten the wires at 11e between the successive lengths of tubing in order to increase the radiating area.

According to a further feature of the present invention, instead of separate straight lengths of wire such as 10 in Fig. 1, the method of this embodiment may be practiced on a sinuous wire 25, as shown in Fig. 7. Since 120 or more wire lengths may be utilized per assembly, it will be appreciated that the use of a sinuous wire, cut off to the desired length, will effect great simplification in the method of this embodiment. In practicing the method on the sinuous wire 25, it will be understood that spaced grooves or bends are formed in each straight length portion such as 10' of the wire just as in length 10. Each groove of each straight length such as 10' will be in longitudinal alignment with corresponding grooves in each of the other straight lengths of the wire to give a resultant structure as shown in Fig. 5. The method practiced on the sinuous wire of Fig. 7 is thus identical to that disclosed in Figs. 2 to 6.

The assembly may be finished by hot galvanizing, or a black enamel paint finish may be applied. If desired, the assembly may be welded in several places to increase its rigidity without unduly sacrificing the manufacturing advantages of the present invention.

The wire is considered as being "backed" in the description and claims if movement is substantially restrained at some time during the forming operation whether or not the plate or wire is initially supported by a stationary die surface, for example, and is considered as being operatively or effectively "unbacked" if no such restraint is applied during the forming operation. The term "tube" as used in the claims is not to be limited to a circular cross section.

Generally, the method of the present invention will be practiced on a relatively flexible wire having a diameter, for example, in the neighborhood of 5/32 inch or less so that means must be provided in the embodiments of both Figs. 1 and 7 for retaining the wire lengths 10 or 10' in proper relation during the forming operation of Fig. 3, such as grooves 15b. Other means could of course be employed such as flattening the portions 11e before the operation of Fig. 3, and/or using cooperating spring-pressed holding pads with the upper and lower dies. A spring-urged pad associated with the lower die 14 and having grooves therein could engage the lengths 11e of Fig. 3 when placed in the lower die and accommodate the downward movement of portions 11e as the upper die moved toward the position shown in Fig. 3.

The present application is a division of my copending application Serial No. 500,152, filed April 8, 1955.

It will be apparent that modifications and variations may be effected without departing from the scope of the novel concepts of the present invention.

I claim as my invention:

1. The method of securing a plurality of wires to a fluid conducting member which comprises forming each wire with a bend to encompass a portion of the perimeter of said member, inserting the member in said bends, and while maintaining the wires in predetermined relation wrapping the wires into interlocking relation to the member and indenting the member at a plurality of points along the fluid passage therein by relatively forcing the wires to indent inside the walls of said member.

2. The method of making a tube and wire heat exchanger which comprises forming successive lengths of wire with bends to receive successive portions of the perimeter of a heat exchange tube, wrapping the successive lengths of wire into interlocking relation to said heat exchange tube, and relatively forcing said successive lengths of wire to indent into the wall of said heat exchange tube.

3. The method of making a tube and wire heat exchanger which comprises bending a single continuous wire to form a number of generally parallel spaced straight lengths thereof lying in a common plane, forming aligned bends in the respective straight lengths of wire, placing a straight length of heat exchange tubing transversely to said straight lengths of said wire and in the aligned beads with each of the aligned encompassing a portion of the perimeter of said heat exchange tubing length, positioning the bends in grooves in a support die face to rigidly laterally confine said bends in fixed relation along said tubing length, relatively bringing a second die face toward said support die face to form said lengths of wire about more than a semi-periphery of said tubing length, and relatively forcing said successive lengths of wire to indent into the wall of said heat exchange tubing length.

References Cited in the file of this patent

UNITED STATES PATENTS

| | | |
|---|---|---|
| 1,678,941 | Helman | July 31, 1928 |
| 2,567,716 | Kritzer | Sept. 11, 1951 |
| 2,571,505 | Waldron | Oct. 16, 1951 |
| 2,620,170 | Brickman | Dec. 2, 1952 |
| 2,646,259 | Powell | July 21, 1953 |
| 2,703,702 | Meinel | Mar. 8, 1955 |
| 2,732,615 | Sandberg | Jan. 31, 1956 |
| 2,734,259 | Beck | Feb. 14, 1956 |
| 2,759,166 | Mallina | Aug. 14, 1956 |